Jan. 3, 1961 T. H. HOLMES 2,967,069
QUICK DISCONNECT JOINT
Filed Oct. 2, 1956 2 Sheets-Sheet 1

INVENTOR
TRENT H. HOLMES
BY M. B. Tasker
ATTORNEY

Jan. 3, 1961  T. H. HOLMES  2,967,069
QUICK DISCONNECT JOINT
Filed Oct. 2, 1956  2 Sheets-Sheet 2
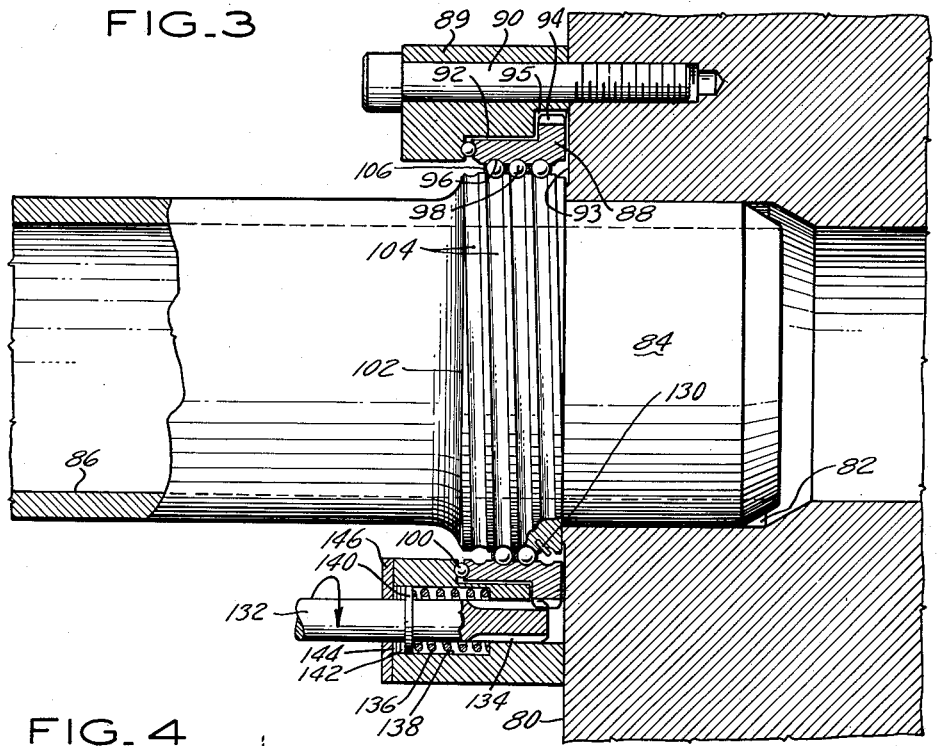
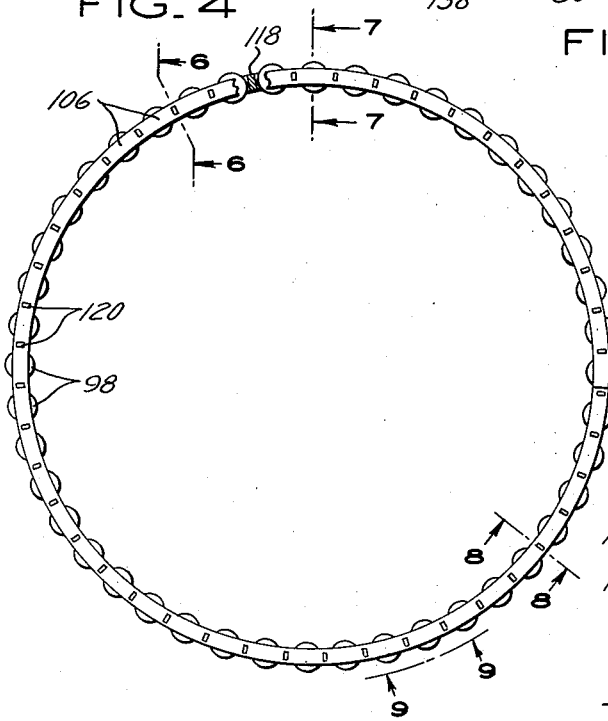
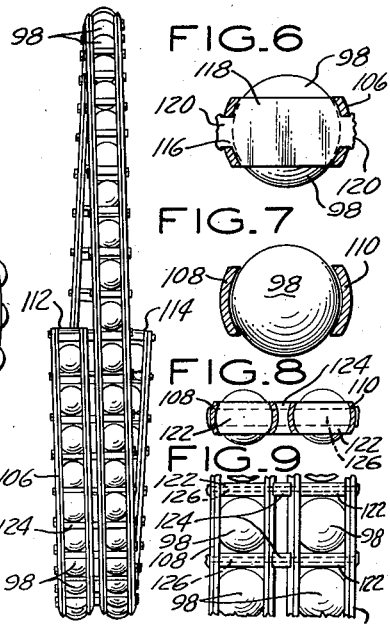
INVENTOR
TRENT H. HOLMES
BY M. B. Tasker
ATTORNEY United States Patent Office 2,967,069
Patented Jan. 3, 1961

2,967,069
QUICK DISCONNECT JOINT

Trent H. Holmes, Rocky Hill, Conn., assignor to United Aircraft Corporation, East Hartford, Conn., a corporation of Delaware Filed Oct. 2, 1956, Ser. No. 613,411

3 Claims. (Cl. 285—399)

This invention relates to quick-disconnect joints for mounting accessories or the like and particularly to joints of this type which can be remotely operated.

One object of this invention is therefore to provide a quick-disconnect joint in which the holding member for maintaining the joint connected is actuated in the connecting and disconnecting operation by a remotely controlled drive.

Another object of the invention is to provide a quickly connectable and disconnectable joint in which the joint when connected is normally locked against accidental operation, as for example by vibration, and yet in which the means for operating the joint are always present in the proper association for immediate use either to connect or disconnect the joint.

A further object of the invention is to provide a normally locked quick-disconnect joint of this type having an actuating shaft in which the locking and unlocking is controlled by the actuating shaft.

A further object of the invention is to provide an improved connecting and disconnecting mechanism for mounting an accessory on a base, the operating parts of which are carried either by the accessory or by the base at all times, thus avoiding loose parts which may become mislaid.

A further object of the invention is to provide improved anti-friction connecting and disconnecting mechanism for a quick-disconnect joint of this type.

A still further object of the invention is generally to improve the construction and operation of disconnectable joints.

These and other objects and advantages will be evident or will be pointed out in the following description of two embodiments of the invention shown in the accompanying drawings.

In these drawings:

Fig. 3 is a sectional side elevation of a modified form of the structure shown in Figs. 1 and 2;

Fig. 4 is a side elevation on a much enlarged scale of the ball and retainer unit of Fig. 3;

Fig. 5 is an end view of Fig. 4;

Fig. 6 is a sectional view on line 6—6 of Fig. 4;

Fig. 7 is a sectional view on line 7—7 of Fig. 4;

Fig. 8 is a sectional view on line 8—8 of Fig. 4; and

Fig. 9 is a view taken on line 9—9 of Fig. 4.

Figure 1:
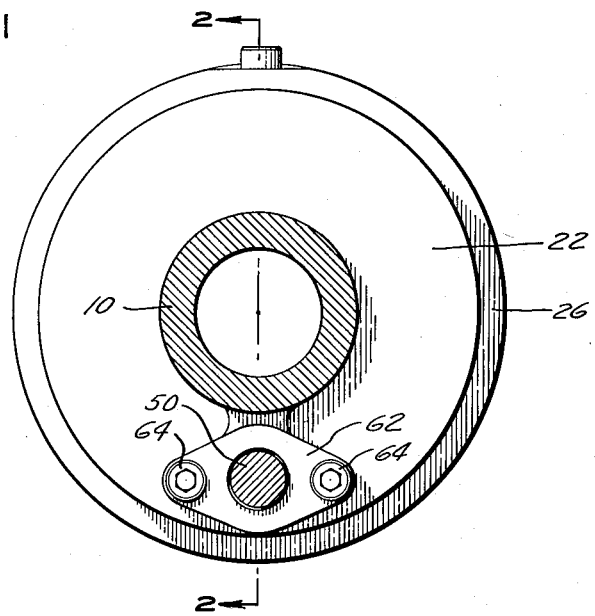
Fig. 1 is a transverse sectional view taken on line 1—1 of Fig. 2.
Figure 2:
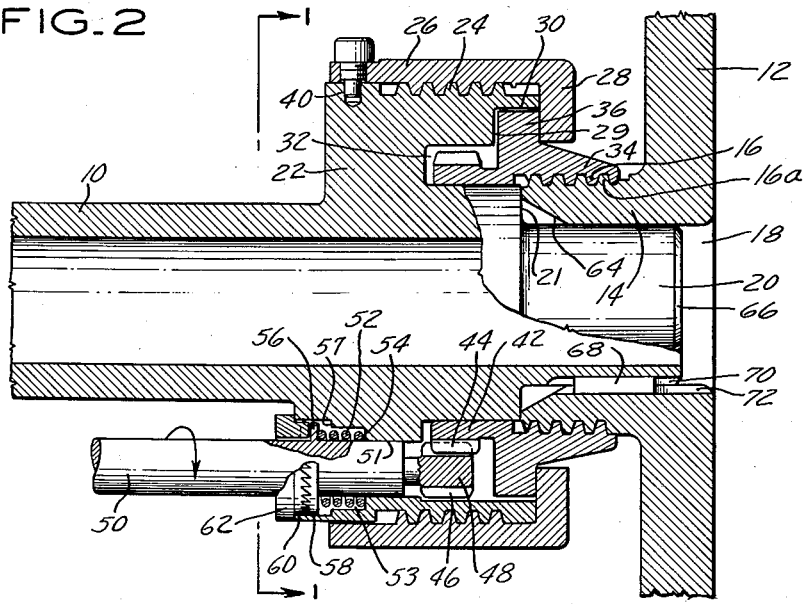
Fig. 2 is a longitudinal sectional view taken on line 2—2 of Fig. 1.

Referring first to Figs. 1 and 2, the disconnect joint embodying the invention is shown for connecting an accessory member, herein a hollow shaft 10, to a base member, herein a vessel having a casing 12. The casing has an external cylindrical boss 14 provided with external screw threads 16a. An axial bore 18 extending through the boss and into the casing is adapted to receive a reduced end portion 20 of shaft 10 with the shoulder 21 at the end of the reduced portion on the shaft abutting the end of boss 14.

Shaft 10 has an enlarged portion, or head, 22 of generally cylindrical shape provided with external screw threads 24 over a major portion of its length on which a nut retaining cap 26 is adjustably threaded. Cap 26 has an inwardly directed flange 28 which, with a recess 29 in the portion 22, provides an annular radial recess 30. An annular connector, or nut, 34 has a radial annular flange 36 which extends into recess 30. It will thus be evident that the nut 34 is held in place on the enlarged portion 22 by cap 26 against axial displacement but is freely rotatable relative thereto to engage the threads 16 of nut 34 with threads 16a on boss 14. The cap 26 is held against rotation by a shoulder screw which is screw threaded into the cap and projects into a recess 40 in the enlarged portion 22.

Annular nut 34 is also provided with an axial extension 42 which projects into a recess 32 in head 22 and is provided with external gear teeth 44 which mesh with gear teeth 46 of a nut driving pinion 48 on an actuating shaft 50. Shaft 50 is journalled eccentrically of shaft 10 in the enlarged portion 22 in a passage 51 which communicates with recess 32. Shaft 50 is free for a limited amount of axial movement during which the pinion 48 slides relative to the teeth 44 on nut 34, the cooperating teeth 44 and 46 being sufficiently long so that they always remain in substantially full engagement.

Shaft 50 is constantly biased to the left (Fig. 2) by compression spring 52 located in an enlarged portion 53 of passage 51 and is compressed between a shoulder 54 formed by portion 53 and an integral collar 56 on shaft 50. Collar 56 has ratchet teeth 58 cut on its left-hand face which mesh with cooperating ratchet teeth 60 cut on the adjacent right-hand face of a plate 62 secured to the enlarged portion 22 by a pair of threaded cap screws 64 (Fig. 1). Passage 51 is further enlarged to receive collar 56 and provide a shoulder stop 57 for limiting the movement of the collar to the right. Movement of collar 56 to the left is limited by plate 62 which surrounds shaft 50 and forms a closure for passage 51.

The insertion of shaft 10 into bore 18 is made easy, even if the shaft is long and is manipulated from its remote end, by providing a bevel 64 at the mouth of the bore and by chamfering the leading end of the shaft at 66. Shaft 10 is prevented from rotation relative to the casing by a key 68 which is seated in keyways 70 and 72 in the shaft and the boss respectively. Preferably the key is permanently secured in one or the other of the keyways.

The device shown in Figs. 1 and 2 is particularly adapted for a situation in which a shaft or pipe must be connected and disconnected from a vessel at a point remote from the vessel. Assuming that the parts are in the position shown in Fig. 2 in which the pipe 10 is connected to the vessel, in order to disconnect the pipe the actuating shaft 50 is first pushed axially to the right (Fig. 2) against the bias of spring 52 to disengage the ratchet teeth 58 and 60, thus unlocking the shaft for rotation. Rotation of shaft 50 in the direction of the arrow in Fig. 2 will cause the nut driving pinion 48 to rotate nut 34 in a direction to run the nut off thread 16 and disconnect shaft 10 from boss 14. It will be noted that this rotation of the nut causes flange 36 on the nut to engage the left-hand wall of recess 29 and force the reduced end portion 20 of the shaft 10 out of bore 18. The shaft can then be removed with the nut 34 held captive by cap 26 until it is desired to again connect the pipe to the boss. Here, again, rotation of the shaft 50 in the opposite direction to the arrow in Fig. 2 will cause flange 36 to engage flange 28, move shaft 10 forcibly into the bore and seat shoulder 21 forcibly against the end of the boss. During this connecting operation it is, of course, necessary to rotate the shaft 10 to align its keyway with key 68, assuming that the key 68 is fixed in keyway 72 of casing 12.

It will be evident that by the construction above described a quick-disconnect joint has been provided which can be operated at a point remote from the connection. It will also be evident that all the parts of the joint are always in position in readiness for operation, since there are no loose parts to become misplaced. Also, by reason of the ratchet locking mechanism, a joint has been provided which cannot become loosened in use as a result of vibration or accidental movement of the actuating shaft. It will further be clear that the disconnectable joint has been provided which is extremely simple and, therefore, inexpensive to manufacture and reliable in operation.

In the modification shown in Figs. 3 to 9, a base member 80 has an annular socket 82 adapted to receive the end portion 84 of hollow shaft 86. In this form of the invention the nut 88 is carried by base member 80. To this end a collar 89 is secured to base member 80 about the socket therein and is secured by a series of peripheral studs 90, one of which is shown in Fig. 3. Collar 89 has an annular recess 92 in which nut 88 is rotatably supported.

The nut has external gear teeth 94 which are located in a radial extension 95 of recess 92 and is provided internally with spiral grooves 96 to receive balls 98. These grooves comprise the internal threads of the nut. Preferably a ball thrust bearing 100 is located between the end of recess 92 and the adjacent end of nut 88 to take the tightening thrust. The other end of the nut engages the flat face 93 of base member 80 during the releasing operation.

Shaft 86 has an annular enlarged portion 102 which is provided with spiral grooves 104 which cooperate with the balls 98 to provide a threaded connection between the nut and the shaft 86. The balls 98, of which enough are provided to at least completely encircle the shaft portion 102, are retained by an annular cage 106 somewhat similar to the cages used in ball bearings.

Cage 106, however, differs from the annular cage of a ball bearing in that it is helical in form to conform to the pitch of the spiral grooves 96 and 104 in nut 88 and shaft portion 102. As shown herein the cage comprises one and one-half turns, although its length can vary considerably either way.

The cage is constructed of side plates, or strips, 108 and 110 which are curved along their length to embrace the balls 98. These plates, which extend continuously from one end 112 of the cage to its other end 114 (Fig. 5) have opposed rectangular holes pierced through them to receive the rectangular end tabs 116 of spacers 118, one of which is located transversely of the strip between each pair of adjacent balls. These tabs are headed over where they project beyond the outer sides of the plates as indicated at 120 (Fig. 6).

Where the convolutions of the cage overlap, as they do throughout approximately one-half a turn, the adjacent portions of the cage are rigidly secured together in the proper pitch relation. The means for securing them is shown in Figs. 5, 8 and 9.

As shown in detail in Fig. 8, a spacer 122 is provided between each pair of side plates 108, 110 which resembles the spacers 118 without their tabs 116. A center spacer 124 is provided between adjacent side plates 110, 108 of the two cage convolutions. This intermediate spacer is curved at its ends to fit the curvature of the plates and is of proper length to maintain the pitch relationship between convolutions. The three spacers 122, 124 and 122, all of which are in alignment, have rectangular holes therethrough which are in alignment with the rectangular pierced holes in side plates 108, 110. A long flat prong 126, shown dotted in Fig. 8, extends through the spacers and through the side plates of the two convolutions and is headed over at its ends outside the most remote side plates. It will be noted that this prong 126 has a cross-section equal to the cross-section of the tabs 116 on spacers 118. Consequently, the rigid means for connecting adjacent convolutions of the cage including the spacers and prongs can be applied wherever overlapping of the convolutions of the cage occurs.

The spiral cage with its balls is threaded onto the threads 104 of enlarged portion 102 of shaft 86. A pin 130 is then driven into an oblique hole in the end thrust to prevent the ball assembly from turning off the end of the thread. When end 84 of shaft 86 is inserted into bore 82 and nut 88 is rotated by turning the actuating shaft in the direction of the arrow in Fig. 3, the pipe will be forced into the aperture until the end of enlarged portion 102 thereof abuts base member 80.

During the rotation of nut 88 to connect the members the balls will roll along the threads 104 of the shaft portion 102 into the position shown in Fig. 3.

The actuating means for the nut is essentially the same as that shown in Figs. 1 and 2 and includes an actuating shaft 132 having a splined end 134 journalled in the collar 89 and projecting into the radial extension 95 of recess 92 where the gear teeth 94 on nut 88 mesh with the splines on the end of shaft 132. The splined end of shaft 132 is normally spaced a short distance from the flat face of base member 80 as shown in the drawing. A compression spring 136 is located in a recess 138 surrounding the shaft with one end abutting the bottom of the recess and its other end abutting a collar 140 fixed to the shaft and located within the recess 138. The collar 140 has ratchet teeth 142 on its left-hand face which are biased by the spring into engagement with meshing ratchet teeth 144 on a cover plate 146 which forms a closure for recess 138 as well as a bearing for shaft 132.

In the operation of this modified form of the invention, to connect shaft 86 to base member 80 the ball assembly is rotated in a direction to move it axially along the shaft until it is stopped by the pin 130. The shaft is brought to a point where the first ball 98 of the ball assembly is just making contact with the first groove 96 on nut 88. Shaft 132 is then pushed to the right (Fig. 3) to disengage the mating ratchet teeth 142 and 144 and rotated to drive nut 88 and cause the balls to move over the spiral grooves. During this movement the shaft 86 will be advanced into socket 82 of the base member 80 as the ball assembly moves axially to the left (Fig. 3) until the adjacent shoulder formed by enlarged portion 102 engages the base member 80 as shown in the drawing.

It will be evident that during the tightening of the nut in the connected position shown the ball thrust washer 100 and the anti-friction nut above described will greatly reduce the friction encountered. This anti-friction joint together with the mechanical advantage obtained in the spline and gear teeth of shaft 132 and nut 88 enable a very firm engagement between the shaft 86 and base member 80 to be obtained.

While only two embodiments of the invention have been shown for purposes of illustration, it will be evident that various changes in the construction and arrangement of the parts may be resorted to within the scope of the invention.

I claim:
1. A ball bearing drive unit for use between mutually threaded relatively axially movable elements comprising a helical ball retaining cage having a plurality of ball retaining sockets spaced along its length, the length of said cage being more than one convolution, and a ball held captive in each of said sockets, said cage comprising side strips curved to conform to the curvature of said balls, a spacer element between each pair of adjacent balls, and spacer elements secured between adjacent strips of overlying convolutions of said cage having a thickness sufficient to space the balls of adjacent con- volutions apart a distance equal to the pitch of the thread of said elements.

2. In a quick-disconnect joint adapted for operation from a remote point, base and accessory members, said base member comprising a vessel having a casing provided with an axial bore therethrough communicating with the interior of the vessel and said accessory member including a hollow shaft having an end portion adapted to be received in said bore, said hollow shaft having an enlarged annular portion adjacent the end portion thereof which is adapted to be moved axially relative to and seat against said base member about the axial bore therein, said enlarged portion having spiral ball receiving grooves formed in the external annular surface thereof, a collar secured to the face of said base member about said bore having an internal diameter which is larger than the enlarged annular portion on said accessory member, said collar also having an internal recess adjacent the bore in said base member, an annular nut member located in said internal recess having external teeth forming a ring gear and having spiral ball receiving grooves formed on its internal surface in position to confront the spiral grooves on said accessory member when the latter is inserted in said bore, an actuating shaft journalled in said collar having a pinion gear meshing with the external gear teeth on said nut member for rotating the latter to connect and disconnect said base and accessory members, and anti-friction driving means for said accessory member between said ball receiving grooves on the external enlarged surface portion of said accessory member and on the internal surface of said nut and free to travel axially along the latter as it is rotated including a spiral ball retaining cage of more than one turn comprising two spiral side plates having opposed ball receiving sockets therein, and means for spacing said side plates to position said balls at the correct pitch for said grooves, said ball retaining cage having an axial length not more than half the axial length of the spiral ball receiving grooves in said shaft and said nut member, whereby upon rotation of said actuating shaft to rotate said nut said accessory member will be drawn into said bore by said antifriction means as the latter travels in the opposite axial direction along said nut into seating engagement against said base member.

3. A ball bearing drive unit for use between mutually threaded relatively axially movable and confronting members including a helical ball retainer, said retainer comprising allochiral side plates of more than one turn having confronting ball retaining sockets spaced along the length thereof, a ball held captive in each of said confronting pairs of sockets, said side plates being pierced between each of said sockets to provide aligned passages therethrough, convolution spacers between adjacent left- and right-hand side plates of overlapping convolutions of said retainer having a length suitable to space the balls of adjacent convolutions a distance equal to the pitch of the threads on said confronting members, side plate spacers between the side plates of each convolution of said retainer located between adjacent sockets therein, said convolution spacers and said side plate spacers having passages therethrough which align with the passages in said side plates, and a prong extended through each set of the aligned spacers and through the aligned passages of said side plates of said retainer and headed over at its ends outside the most remote side plates.

References Cited in the file of this patent

UNITED STATES PATENTS

| | | |
|---|---|---|
| 337,974 | Moore | Mar. 16, 1886 |
| 1,067,878 | Owen et al. | July 22, 1913 |
| 1,194,236 | Richards | Aug. 8, 1916 |
| 1,264,736 | Wilson | Apr. 30, 1918 |
| 1,367,499 | Rapson | Feb. 1, 1921 |
| 1,736,149 | Dunmire | Nov. 19, 1929 |
| 1,831,956 | Harrington | Nov. 17, 1931 |
| 1,885,970 | Westling | Nov. 1, 1932 |
| 1,910,161 | Harrington | May 23, 1933 |
| 1,915,014 | Carter | June 20, 1933 |
| 2,050,702 | Jackson | Aug. 11, 1936 |
| 2,069,471 | Baker | Feb. 2, 1937 |
| 2,076,180 | Griswold | Feb. 2, 1937 |
| 2,234,056 | Moore | Mar. 4, 1941 |
| 2,266,923 | Trbojevich | Dec. 23, 1941 |
| 2,369,209 | Bullard et al. | Feb. 13, 1945 |
| 2,511,109 | Haskell | June 13, 1950 |
| 2,728,895 | Quackenbush et al. | Dec. 27, 1955 |
| 2,770,155 | Morgan | Nov. 13, 1956 |

OTHER REFERENCES

| | | |
|---|---|---|
| 541,739 | Germany | Jan. 18, 1932 |
| 995,398 | France | Aug. 22, 1951 |
| 707,988 | Great Britain | Apr. 28, 1954 |